Sept. 18, 1945. M. M. MARISIC 2,384,942
CONTACTING PROCESS
Filed March 3, 1943 2 Sheets-Sheet 1
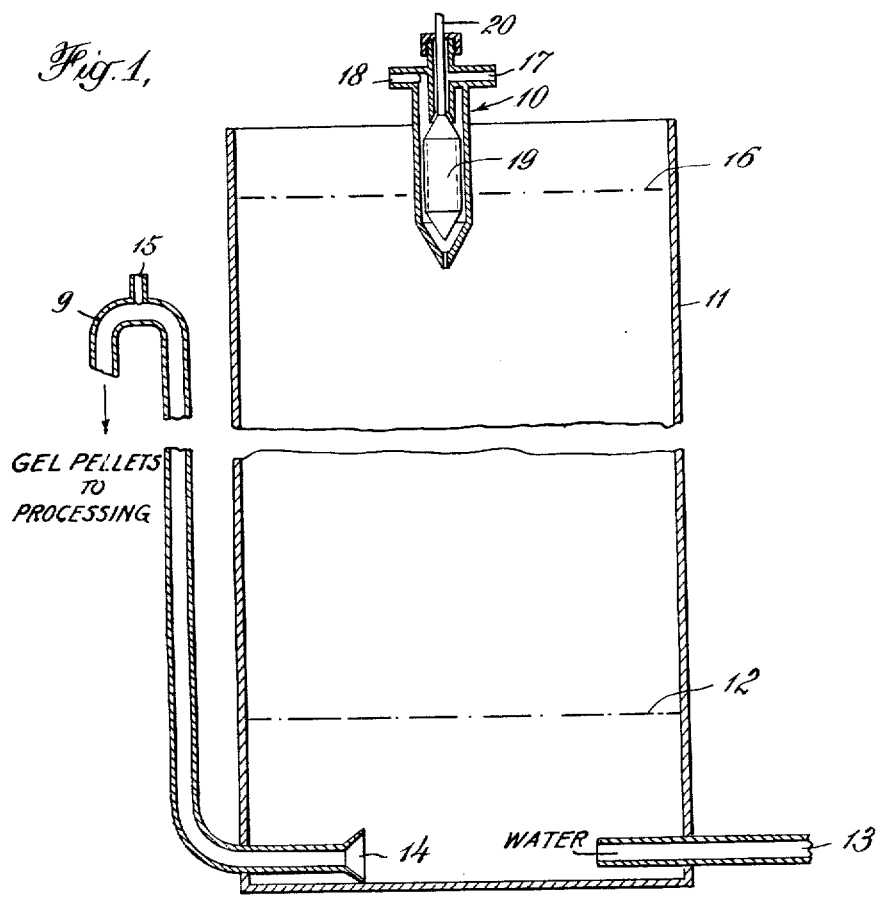
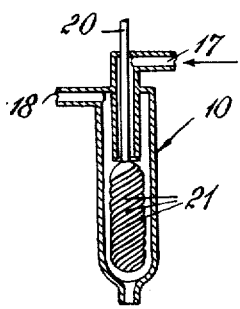
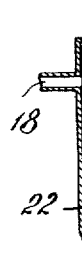
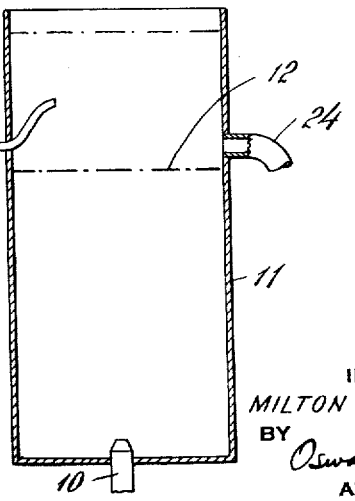
INVENTOR
MILTON M. MARISIC
BY
ATTORNEY Sept. 18, 1945.   M. M. MARISIC   2,384,942
CONTACTING PROCESS
Filed March 3, 1943   2 Sheets-Sheet 2
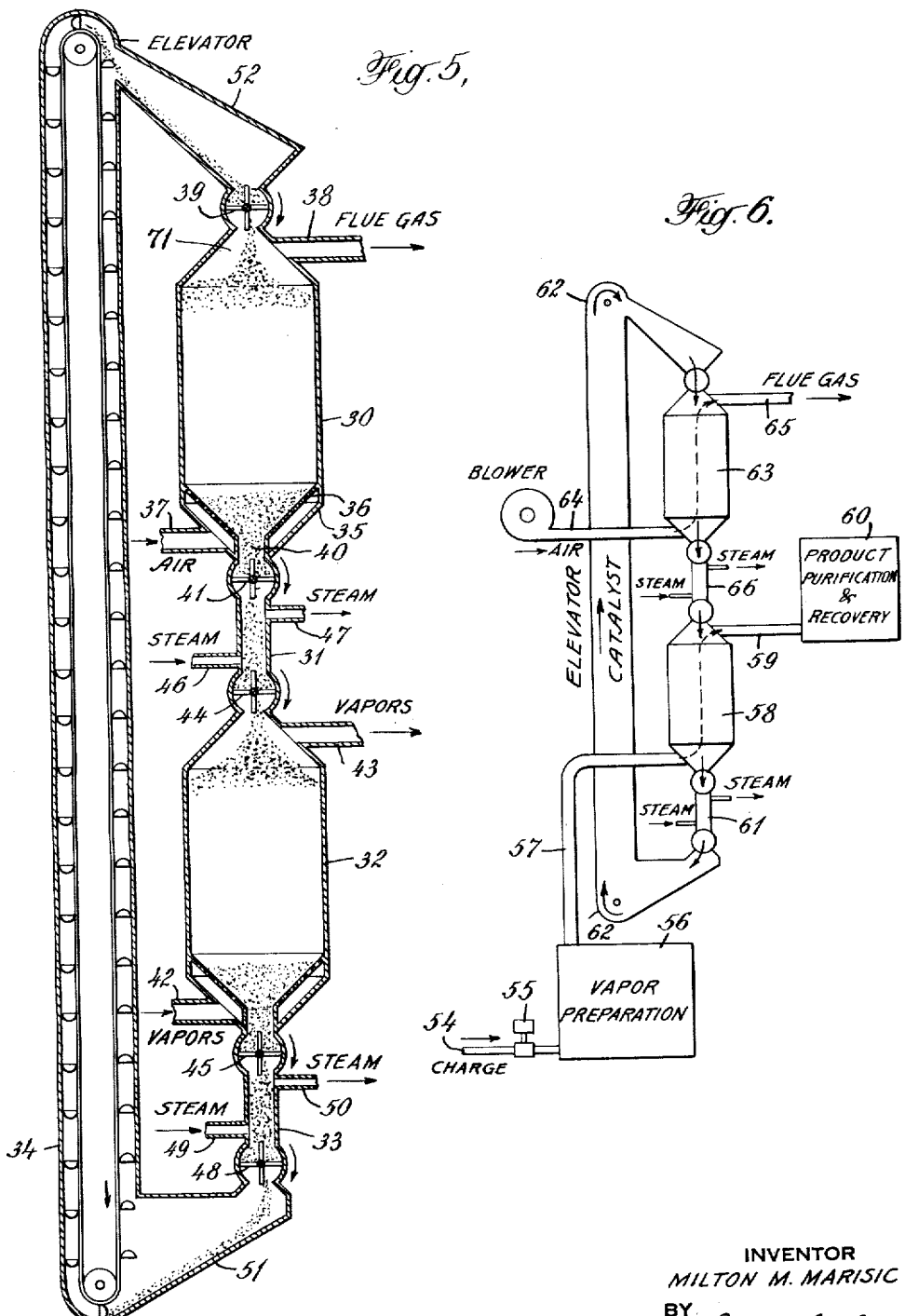
INVENTOR
MILTON M. MARISIC
BY
ATTORNEY Patented Sept. 18, 1945

2,384,942

UNITED STATES PATENT OFFICE 2,384,942

CONTACTING PROCESS

Milton M. Marisic, Woodbury, N. J., assignor to Socony-Vacuum Oil Company, Incorporated, a corporation of New York Application March 3, 1943, Serial No. 477,898

5 Claims. (Cl. 196—52)

This invention is directed to processes of contacting a fluid with a solid and is specifically concerned with the provision of a process utilizing a solid which may be of conventional chemical composition but is possessed of novel physical properties rendering it peculiarly suitable to the purpose.

In many commercial processes it is found desirable to contact a fluid with a solid to treat or modify either contacting material. The problems of handling the contacting materials are similar in all such processes and adequate discussion is advantageously conducted in connection with a typical process. The vapor phase conversion of initial hydrocarbons to hydrocarbons of different properties in the presence of a solid catalyst is such a typical process. Among the other processes to which the invention is adapted, may be mentioned treatment of water with zeolitic solids, etc. Catalytic hydrocarbon conversions are usually carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, alkylation, aromatization, reforming, polymerization, desulfurizing, partial oxidation and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operations as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressively decreasing activity of catalyst. This same feature, with apparatus limitations, prevents, to a degree, the use of catalyst, at a uniform high efficiency level. Most of these difficulties may be avoided by the use of a method wherein the catalyst or contact mass is handled continuously as well. The catalyst of this invention is particularly well adapted to such a process, although advantages over previous catalysts are noted in stationary bed operations.

This invention has for its preferred object the provision of a solid contact material in spheroidal form for a process of solid-fluid contacting, wherein a continuously moving stream of fluid is contacted with a continuously moving stream of spheroidal pellets for the purposes of the process, in which the contact mass is used only at a high level of efficiency, since the contact material is preferably continuously removed and regenerated, and then returned to the contacting step, both operations being conducted under controlled conditions.

In operations of this type, the term "gel" has been rather loosely applied to include both true gels and gelatinous precipitates. In forming pellets of either, the gel or precipitate has been caused to form completely and then subjected to suitable operation for the formation of particles. These have not been particularly satisfactory because the particles obtained are not resistant to losses by shock breakage and abrasion. The common operations include breaking a mass of gel to fragmentary particles and screening to separate particles of desired size. This results in the production of a considerable amount of fines which are a loss since they cannot be used in present catalytic equipment. In some cases, the wet gel is molded. This requires expensive molding equipment and costly cleaning of molds. It is also proposed (Reissue Patent 21,690) to separate the mass into two parts, one of which is dried and crushed and the other used wet to bind the crushed portion in a molding operation which involves the usual objections to molding.

The present catalyst is prepared by a method which eliminates the heretofore necessary step of converting formed gel masses into a usable form by some type of pelleting operation. Another feature is that the gel contact masses are produced in spherical and/or spheroidal shapes. This form is ideal for any process in which a contact bed is utilized, whether it be of the stationary or the moving (or flowing) type of bed. Spherically-shaped particles can pack only in a uniform manner, hence, channeling of vapors or fluids flowing through this type of bed is impossible. For an operation in which a moving (or flowing) contact bed is employed, pellets of a spherical shape afford unique flow characteristics.

This process of forming the pellets involves continuously contacting within an enclosed mixing chamber such as an injector or nozzle mixer, streams of reactant solutions of such concentrations and proportions that no gelation occurs within the mixer, but only at some pre-determined time after leaving the mixer, and under such conditions of flow that each stream is completely and uniformly dispersed within and throughout the other at the instant of contact. The resulting colloidal solution is ejected from the mixer through an orifice or orifices of suitable size so as to form globules of the solution which are introduced into a fluid medium where the globules of the colloidal solution set to a gel before they pass out of that medium. The fluid medium may be any liquid or combination of liquids which is immiscible with water such as, for example, petroleum naphtha, kerosene, hydrocarbon oils, etc.

There are two alternative methods of operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away for processing.

The shapes of the formed gel are dependent upon the rate at which the globules of the colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence, the gel pellets will assume flat or disc-like shapes. Examples of liquids in which pellets of this type may be produced are benzene, carbon tetrachloride, or petroleum naphtha. A water-immiscible fluid medium having a high viscosity or a density close to that of the colloidal solution will effect slow movement of the globules of the latter solution and thus form spherically-shaped gel pellets. It is apparent from the above description that gel pellets of any shape, varying from flat-like discs to perfect spheres, may be manufactured by choice of a water-immiscible fluid medium having the proper density and viscosity.

The success of this process is due to the fact that the gelation time for a large number of materials can be controlled very accurately.

I have studied the preparation of many gels in which silica is the predominant component and found that the gelation time can be controlled so that the invention described above may be utilized in their preparation. The following is a list of the gels I have prepared by the methods described herein: silica gel, silica-alumina, silica-stannic oxide, silica-ceria, silica-thoria, silica-alumina-thoria, silica-alumina-stannic oxide, silica-alumina-ceria, silica-zirconia, silica-zirconia-alumina. Further, the methods described herein may be extended to the preparation of many other types of gels.

The time of gelation is dependent upon temperature, pH and concentrations of reactants. The higher the temperature, the shorter the time of gelation. At fixed concentrations of reactants the gelation time increases with decrease in pH provided the pH is within the limits of the invention. When the temperature and pH are constant, the gelation time decreases as the reactant solutions are made more concentrated. Considerations controlling gelation time are discussed in detail in my copending application Serial No. 461,455, filed October 9, 1942.

Briefly, the invention contemplates a pellet of generally rounded outline having uniform porosity, a hard surface and unusually high crushing strength. These pellets are better suited to stationary bed operation than conventional molded pellets because of their high resistance to breakdown in transportation and use; but their advantages are achieved to a very high degree when used in continuous processes involving constant exposure to forces tending to abrade and crush the pellets.

Other objects and advantages will be apparent from the detailed description below when considered in connection with the attached drawings wherein:

Figure 1 shows apparatus for use in preparing the catalyst;

Figures 2 and 3 show modified types of mixing nozzles for the apparatus of Figure 1;

Figure 4 is a modified type of apparatus for forming the pellets;

Figure 5 is an illustration in vertical section of apparatus for continuous catalytic conversion of hydrocarbons; and Figure 6 is a diagrammatic showing of a plant unit including auxiliaries for the process.

Referring to Figure 1, a mixing nozzle, indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped on the surface of the fluid but this tends to break them and impairs control over pellet size obtained by injecting the colloidal solution under the surface of the liquid. It must be borne in mind that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

In the mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotor are grooved; thus, efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the rates of the reactant solutions are so high that the time the latter solutions spend in the mixing chamber is only a very small fraction of the gelation time.

A further modification is the extremely simple mixer of Figure 3 wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

A peculiar feature of the present gel pellets is their transparency—having the appearance of clear glass beads, in many cases. This appearance is retained only when silica is predominant, the transparency being lost as content of other oxides is increased. For example, 25% thoria or 15% alumina are about the upper limits for glassy appearance of silica-thoria and silica-alumina gels, respectively, when prepared from colloidal solutions having a pH below 8. At a pH above 8, white translucent gels are produced, even from pure silica.

The present pellets are extremely hard and, due to this property and their smooth surfaces, are capable of resisting losses by attrition and shock in handling for periods many times longer than the molded pellets used heretofore.

*Example I*

Solution of sodium silicate containing 105 grams of $SiO_2$ per liter was prepared by diluting "N" brand of sodium silicate (28.7% $SiO_2$, 8.9% $Na_2O$). This solution was mixed with a second solution containing 34.10 grams of $Al_2(SO_4)_3$ and 25.05 grams of $H_2SO_4$ per liter at the ratio of 1.00 volume of the former solution to 0.780 volume of the latter. The resulting colloidal solution leaving the mixer through orifices was introduced into the top of a column of gas oil whose depth was eight feet. The globules of solution fell through the oil and gelled before passing into the layer of water located beneath the oil. The gel in the globular form was conducted out of the bottom of the column in a stream of water and on removal from the water, it was washed with petroleum naphtha to remove oil from its surface. It was then washed with water and $NH_4Cl$ solution, to replace zeolitically held sodium ions by ammonium ions which are capable of being driven off as $NH_3$ gas by heat. The gel was dried slowly and uniformly at 180° F. until shrinkage was substantially complete and the drying was continued at a gradually-increasing temperature up to 1050° F. at which temperature it was maintained for two hours. The silica-alumina gel retained its spheroidal shape during the washing and drying operations.

Alternatively, the hydrogel pellets may be dried without shrinkage by replacing the liquid phase, water, with a liquid of relatively low critical temperature, such as alcohol, heating to the critical temperature while maintaining pressure sufficient to maintain the alcohol liquid and permitting vaporization of the alcohol at a temperature above the critical.

The time of gelation for the concentrations and proportions of reactants given above was about ten seconds, while the pH was 6.9. The gas oil employed was a fraction of Oklahoma City gas oil having a boiling range of 471° to 708° F. and a specific gravity of 0.846.

*Example II*

This example illustrates the use of chlorobenzene as a fluid medium and the mixing of reactants at such concentrations and proportions that the gelation time was approximately twenty seconds while the pH was 6.9. Since chlorobenzene has a density of 1.101, the colloidal solution was ejected into the bottom of a ten foot column of chlorobenzene (see Fig. 4), the globules of solution rose through the fluid and gelled before passing into a layer of water contained over the chlorobenzene. The gel was washed and dried as described in Example I (the washing with petroleum naphtha was unnecessary here).

The sodium silicate solution contained 105 grams of $SiO_2$ per liter (prepared from "N" brand sodium silicate) while the second solution contained 27.10 grams $Al_2(SO_4)_3$ and 19.95 grams of $H_2SO_4$ per liter. These solutions were mixed at a ratio of 1.00 volume of the former solution to 0.980 volume of the latter.

Example III

This example illustrates the preparation of spherically-shaped silica gel pellets and the conversion of these into a cracking catalyst. The time of gelation for the concentrations and proportions of reactants given below was about thirty seconds while the pH was 5.7.

The apparatus shown diagrammatically in Figure 1 was employed in the manufacture of the silica hydrogel. A solution of sodium silicate containing 106.3 grams of $SiO_2$ and 33.0 grams of $Na_2O$ per liter, prepared by diluting "N" brand of sodium silicate, was metered accurately and admitted continuously to the mixing chamber by inlet 18 while a metered solution of 3.90 normal hydrochloric acid was continuously fed at inlet 17. The reactant solutions were mixed at a ratio of 3.34 volumes of the sodium silicate solution to 1.00 volume of the acid solution. The resulting colloidal solution leaving the mixer entered at the top of a nine-foot column of petroleum oil having a viscosity of 305 Saybolt seconds (100° F.) and a density of 0.891. The globules of solution fell through the oil and gelled before passing into the layer of water located beneath the oil. The spherically-shaped hydrogel was conducted out of the bottom of the column 11 in a stream of water by means of conduits 14 and 9. The hydrogel was washed with benzene to remove the film of oil and then washed with water until free of sodium chloride. The washed hydrogel was soaked overnight in a 25% solution of

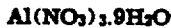

$$Al(NO_3)_3 \cdot 9H_2O$$

and then the excess solution was poured off. The spehrically-shaped silica hydrogel impregnated with aluminum nitrate was dried slowly at 180° F. until shrinkage was substantially complete and the drying was continued at a gradually-increasing temperature up to 1050° F. at which temperature it was maintained for two hours. The aluminum nitrate was converted to the oxide during the heating process, and thus a silica-alumina gel catalyst in the form of spherically-shaped pellets was obtained having good activity as a cracking catalyst.

The hydrogel globules prepared in Examples 1, 2 and 3 were of about 5 millimeters in diameter and no difficulty was encountered in drying and shrinking these to their normal form. It has been found, however, that with hydrogel globules of the order of 8 or 10 millimeters in diameter considerable cracking and splitting of the globules takes place when they are dried rapidly; this may be overcome by treating the globules with boiling water or steam for at least 15 to 30 minutes prior to drying.

The spherical pellets of Example 1 have been compared by hardness tests to pellets formed in conventional manner. A comparison on cracking efficiency shows the present pellets to have substantially the same effect as molded pellets and broken fragments. A silica-alumina hidrogel was prepared by mixing reagents of the same concentration and in the same proportions as in Example 1. This was permitted to gel as a mass in conventional manner.

The hydrogel, after being washed, was divided into two portions, the one part was dried, then crushed to produce fragmentary pieces of the desired size; the other portion of the hydrogel was cast into molds and dried, thus forming small cylindrical pellets. These two forms of gel were subjected to a hardness test developed for cracking catalysts which consists of tumbling an 80 cc. sample of material in a one-pound grease can with one ⅜" x 3¼" Monel metal rod at 80 R. P. M. on a paint roller mill for a period of one hour, then screening the sample to determine the quantity which has powdered and broken down to a size smaller than the original. The fragmentary pieces of gel showed a breakdown of 12%, while the cylindrical pellets were broken down to the extent of 6%. The larger breakdown with the gel in the fragmentary form is probably due to the irregular shapes and to the stresses and fissures developed during the crushing operation.

The spherically-shaped gel of Example 1 under the above conditions of hardness test gave no powdering nor breakdown. Continuing the test for an additional 15 hours merely scratched the surface of the spheres, thus producing only a negligible amount of fines. Subjecting the gel to the hardness test for a total of eighty hours gave 0.3% of material which was smaller in size than the original.

The pellets of this invention may act as carriers for other material in the manner well known in the art.

The gel pellets of the present invention vary in size according to the degree of subdivision of the colloidal solution which is, in turn, a function of several variables, the most important being manner of supplying the colloidal solution and surface tension at the interface between colloidal solution and the immiscible liquid to which it is supplied. Size of the pellets will also be affected by the manner of drying, it appearing that shrinkage during drying is due to capillary action at the meniscus of the liquid phase as it retreats through the porous gel structure. Pellets as large as desired can be prepared; but for most purposes, particularly for catalytic hydrocarbon conversion, maximum sizes are about 10 mms. in diameter. Preferably, the pellets are about 3 to 7 mms. in diameter, while present indications are that 5 mm. particles are of general application.

The pellets are generally spheroidal in shape, usually being somewhat flattened to forms approximating ellipsoids. The irregularity of the shapes and sizes under methods of commercial production are strongly reminiscent of the rounded pebbles in the bed of a water course; though the pellets are, of course, much smaller. For that reason, the best definition of shape seems to be "rounded pellets" designating solids which are bounded substantially solely by smooth curves, and having substantially no plane or angular faces. The surfaces of the pellets, in addition to being made up of smooth curves, are usually inherently smooth themselves; being similar to a glass in smoothness and luster at surfaces resulting from formation as contrasted with fracture surfaces. The resemblance to glass is further intensified by the nature of the fracture and the power to transmit visible light. The fracture is characteristically conchoidal and the pellets are transparent to translucent, depending upon the mode of formation; i. e., concentration and pH of colloidal solution, history of treatment, etc. This is in marked contrast to the molded synthetic gel pellets which are essentially chalky in appearance and physical characteristics, although a little harder than chalk.

The surfaces (both original and fracture surfaces) of the present pellets are extremely hard in view of the chemical and physical nature thereof. Precipitated silica is normally soft and the highly porous nature of the pellets leads to an expectation that the pellets would have easily scratched surfaces. Surprisingly, the surfaces have hardnesses on the order of that of glasses. The preferred types vary in hardness from slightly less than 4 on Mohs' scale to 6 and harder, usually around 5. Pellets are readily obtained on a commercial scale capable of scratching annealed glass such as "Pyrex." The advantages of such hardness are obvious, particularly when coupled, as in the present case with a smooth surface. When used for catalytic conversion of hydrocarbons, for example, particles of catalytic material are either packed in a stationary bed, passed continuously as a moving column through a treating chamber, or suspended in the gaseous material to be contacted. In the continuous processes, the particles are in constant motion and subjected to constant abrasion. Smooth, hard surfaces, such as those of the present pellets, resist abrasion; while the soft rough surfaces of the particles used by the prior art break down rapidly producing undesired fines and using up the catalyst. Even in stationary bed operation, the pellets are subjected to destructive forces. The pellets must be transported to and placed in the apparatus and during operation, flowing gases and fluctuating pressures result in undesirable attrition.

The strength of the pellets is extremely high. Individual particles, prepared in the manner described above, support well over 50 pounds. This is determined by placing a single pellet on an anvil and applying force directly to the upper surface of the pellet until it crushes. Individual pellet strengths in excess of 100 pounds are preferred and strengths of 350 pounds are not unusual in normal pellets prepared as described. A contrast with molded pellets of the same chemical composition is helpful. As prepared commercially, these molded pellets crush under a weight of about 5 pounds. By molding under high pressure it is possible to achieve a strength of about 20 pounds maximum, but pressure molding is not commercially feasible. The crushing strength of the pellets in mass is also extremely high. Normal pellets of this invention will withstand (in mass) pressures upwards of 1000 pounds per square inch and it is preferred that the mass of pellets be capable of withstanding at least 2000 pounds per square inch. Batches have been prepared of pellets which, in mass, withstand pressures of 3000 pounds per square inch or more. For purpose of comparison, it is noted that commercial molded silica gel catalyst in mass crushes under pressures of 500 pounds per square inch, while fragmentary particles of silica gel catalyst in mass crush under pressures of 100 pounds per square inch.

Internally, the present gel pellets have substantially the structure of the original hydrogel with the liquid phase removed. The size of the pellet is, of course, reduced in normal drying and the structure is probably slightly deformed to a degree commensurate with deformation of the pellet as a whole. For all practical intents and purposes, however, the original gel structure is completely retained by the dried pellets. It is a necessary corollary of this fact that the finished gel pellets are uniformly porous as contrasted with molded pellets wherein some portions are badly deformed by the molding operation to largely eliminate a portion of the porous structure.

The apparent density of the product varies in the same direction as the crushing strength, but the strength is not simply a function of apparent density. By the term "apparent density," reference is made to weight, as compared with the volume occupied by a mass of the particles. It is determined by weighing a fairly large volume of particles. For example, a large diameter graduated cylinder is filled to a volume calibration and the weight of pellets determined by difference in weight of the graduate before and after filling with pellets. In general, apparent density of the present pellets varies between 0.5 and 1.1 grams per cc. Lighter pellets having apparent densities as low as 0.3 gram per cc. can be prepared but their hardness and crushing strength are low. Apparent densities above about 0.7 gram per cc. are preferred. By comparison, molded gel catalyst usually has an apparent density around 0.55 gram per cc. Higher densities, up to about 0.75 gram per cc. are possible with high pressure molding. An interesting interdependence of apparent density and composition of the gel pellets has been noted. When silica-alumina gels are prepared by mixing sodium aluminate, water glass and a mineral acid, increased apparent densities permit lowering of the alumina content for equal activities. Strangely, this rule does not apply if the colloidal solution to be gelled is obtained by mixing aluminum sulfate and water glass to obtain a colloidal solution of the same pH, silica content and alumina content. The table below shows the strange relationship noted above. The table shows activities (per cent conversion of a standard charge to gasoline under standard conversion conditions) of a number of $Al_2O_3$—$SiO_2$ gel catalyst pellets prepared by mixing sodium aluminate, water glass and sulfuric acid.

*Table*

| Catalyst composition | | Apparent density of catalyst | Activity |
|---|---|---|---|
| $Al_2O_3$ | $SiO_2$ | | |
| 3.0 | 97 | 0.440 | 25 |
| 5.0 | 95 | 0.465 | 35 |
| 10.0 | 90 | 0.690 | 50 |
| 2.0 | 98.0 | 0.802 | 50 |
| 2.5 | 97.5 | 0.780 | 48 |
| 2.5 | 97.5 | 0.897 | 48 |
| 3.0 | 97.0 | 0.838 | 47 |

Another effect of density is in controlling temperatures of the catalyst mass in use. In regenerating spent hydrocarbon conversion catalysts, carbonaceous deposits are burned off with preheated air. Provision must be made for some means to abstract heat from this highly exothermic reaction to prevent damage to the catalyst. The more dense catalysts have a higher heat capacity per unit volume and are thus able to absorb more heat themselves without suffering heat damage, thus decreasing the load on other heat-controlling means in the system.

As noted above, the present pellets are very well suited to bed-in-place operations of the type described in the patents to Eugene J. Houdry and associates. Much greater advantages are realized, however, in continuous operation in apparatus for passing the catalyst cyclically through conversion and regeneration zones; for example, the apparatus of Figures 5 and 6.

In Figure 5, character 30 denotes a regeneration chamber, 31 a purging section, 32 a reaction chamber, 33 a second purging section, and 34 an elevator for catalyst particles. Regeneration chamber 30 and reaction chamber 32 are similar in construction and internal fittings and consist (referring now to 30), of an exterior shell 30, which may be cylindrical or rectangular in cross-section, with a convergent sealed top 71 and a convergent bottom 35, and fitted with an interior false bottom 36, which is perforate, the perforations therein being too small for the passage of catalyst particles but permitting the passage of liquid or gas. Bottom 35 is fitted with pipe 37, and top 71 with pipe 38. At the top of 71 is a sealed feeding device 39, which may be a star wheel as shown, an intermittently operated valve set-up or other common device of this nature. Catalyst material introduced through 39 fills the interior of shell 30, passes down therethrough, is collected by false bottom 36 and shute 40 and is removed by a second intermittently operating device, such as star wheel 41. This arrangement effects a continuously moving stream of catalytic material through shell 30. Reaction mixture, in this case air for an oxidizing regeneration, may be introduced through pipe 37 and products of reaction, in this case flue gas, may be removed through pipe 38. This effects a continuously flowing stream of reaction material in physical contact with the continuously flowing stream of catalytic material in shell 30. The flow shown is countercurrent. If desired, it may be made concurrent by reversing the functions of 37 and 38. Shell 32 is similarly fitted and similarly operated. Reaction material, in this case hydrocarbons, is introduced by 42, and removed by 43, catalyst movement is controlled by 44 and 45. Confined passage 31, maintained relatively full of catalyst by devices 41 and 44, is fitted with pipes 46 and 47, by means of which steam may be passed through the catalyst for purging. A similar purging passage 33 lies below shell 32, is controlled by devices 45 and 48 and fitted with steam pipes 49 and 50 for purging catalyst after reaction. From 33 the catalyst drops through 48 into boot 51 of elevator 34 by which it is elevated and discharged into bin 52 above shell 30. Elevator 34 may be of the belt and bucket type shown or of any other kind suitable for the physical properties of the catalytic materials. Customary devices for the removal of fines and the addition of makeup may be inserted in the catalyst conveyor system.

Turning to Figure 6, which shows an operating set-up appropriate for a conversion of hydrocarbons, such as, for example, a vapor phase cracking, charge oil is fed through pipe 54 by pump 55 to a vapor preparation unit 56. Vapor preparation unit 56 will consist essentially of a heater, for which purpose any of the usual forms of heater common in the art, say a pipe still, may be used, to heat and vaporize the charge and heat it to reaction temperature, and, if the charge used is not wholly vaporized at the reaction temperature, a vapor separator to remove unvaporized liquid residue. Vapors from 56 move through pipe 57 into and through reaction chamber 58, (the same as 32, Figure 5) and therein undergo catalytic reaction. Reaction products pass through pipe 59 to product purification and recovery equipment denoted by 60. Element 60 may be made up of any of the usual fractionation, separation, and disposal devices currently in common use for handling products of cracking reactions. If desired, product fractions boiling above the desired low-boiling product may be returned to the system for retreatment, either separately or in admixture with fresh charge. Catalytic material flowing from 58 is purged in 61 and elevated by 62 to be introduced into 63 wherein it is regenerated by burning with air supplied by blower and pipe 64, the products of regeneration being disposed of through pipe 65, after which the regenerated catalyst is purged in 66 and returned to 56.

As an example of one operation successfully conducted in such apparatus, according to the process herein disclosed, coastal gas oil with which was admixed steam to the extent of about $$\frac{10 \text{ oil}}{1 \text{ water}}$$

(cold volumes), at a temperature of 800° F. was contacted with a catalyst of activated gel pellets at a rate of one volume of oil (cold) to four volumes of catalyst in a chamber through which the catalyst passed at such a rate that it remained in the reaction zone about 20 minutes, with the following results:

Yield of 410° E. P. gasoline (including isobutane and heavier in gas)
    volume, per cent__ 67.4
Yield of dry gas (lighter than isobutane)
    weight, per cent__ 4.0
Yield of coke_____weight, per cent__ 2.5
Yield of recycle stock_____volume, per cent__ 35.0

In this run the catalyst was passed through the regeneration chamber (of the same size as the reaction chamber) at the same rate, and was burned with a sufficient volume of air to maintain above 10% $CO_2$ in the exit flue gas.

The gasoline produced was of excellent quality, high in anti-knock rating, and the recycle stock was clean, light in color, and of about the same boiling point as the charge. No high boiling, dirty, liquid cracking tar was produced. The regenerated catalyst was equal in efficiency to new catalyst, no detectable deterioration in quality being found.

I claim:

1. In a process for the manufacture of valuable hydrocarbon products by contacting reactants containing carbon and hydrogen with an inorganic synthetic gel, the improvement which comprises contacting said reactants at conditions of temperature and pressure suitable for the process with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

2. In a process for the manufacture of valuable hydrocarbon products by contacting reactants containing carbon and hydrogen with an inorganic synthetic gel containing silica, the improvement which comprises contacting said reactants at conditions of temperature and pressure suitable for the process with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide including silica characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

3. In a process of contacting a hydrocarbon fluid with an inorganic synthetic gel, the improvement which comprises contacting said hydrocarbon fluid with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

4. In a process for modifying or treating a fluid by contacting said fluid with an inorganic synthetic gel under treating conditions adapted to cause the desired effect on said fluid without substantial change in structure or chemical nature of said gel other than accumulation in said gel of substances removable by regeneration to restore the condition of said gel; the improvement which comprises contacting said fluid with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

5. In a process for modifying or treating a fluid by contacting said fluid with an inorganic synthetic gel containing silica under treating conditions adapted to cause the desired effect on said fluid without substantial change in structure or chemical nature of said gel other than accumulation in said gel of substances removable by regeneration to restore the condition of said gel; the improvement which comprises contacting said fluid at conditions of temperature and pressure suitable for the process with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide including silica characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

MILTON M. MARISIC.

CERTIFICATE OF CORRECTION.

Patent No. 2,384,942. September 18, 1945.

MILTON M. MARISIC.

It is hereby certified that error appears in the printed specification of the above numbered patent requiring correction as follows: Page 4, first column, line 50, for "normal" read --final--; line 63, for "hldrogel" read --hydrogel--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.

hard glossy surfaces consisting substantially of smooth curves and characterized by a high resistance to attrition loss, said particles having been produced by a process which comprises forming a hydrosol of inorganic oxide including silica characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

3. In a process of contacting a hydrocarbon fluid with an inorganic synthetic gel, the improvement which comprises contacting said hydrocarbon fluid with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

4. In a process for modifying or treating a fluid by contacting said fluid with an inorganic synthetic gel under treating conditions adapted to cause the desired effect on said fluid without substantial change in structure or chemical nature of said gel other than accumulation in said gel of substances removable by regeneration to restore the condition of said gel; the improvement which comprises contacting said fluid with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

5. In a process for modifying or treating a fluid by contacting said fluid with an inorganic synthetic gel containing silica under treating conditions adapted to cause the desired effect on said fluid without substantial change in structure or chemical nature of said gel other than accumulation in said gel of substances removable by regeneration to restore the condition of said gel; the improvement which comprises contacting said fluid at conditions of temperature and pressure suitable for the process with hard homogeneous porous dried particles of said gel bounded by smooth hard glossy surfaces consisting substantially of smooth curves and characterized by a high resistance to attrition loss, said particles having been produced by a process which comprises forming a hydrosol of inorganic oxide including silica characterized by an inherent capacity to set to a hydrogel upon the lapse of a suitable period of time without addition to or subtraction from said gel of any substance, admitting said sol in the form of separate globules to a body of a fluid medium substantially immiscible with water in which said globules assume spheroidal shape due to surface tension at the interface between said sol and said medium, retaining said spheroidal globules in said medium until gelation occurs thus forming spheroids of hydrogel, effecting retention in said sol of substantially all the constituents of said sol until gelation occurs and drying the hydrogel spheroids.

MILTON M. MARISIC.

CERTIFICATE OF CORRECTION.

Patent No. 2,384,942. September 18, 1945.

MILTON M. MARISIC.

It is hereby certified that error appears in the printed specification of the above numbered patent requiring correction as follows: Page 4, first column, line 50, for "normal" read --final--; line 63, for "hldrogel" read --hydrogel--; and that the said Letters Patent should be read with this correction therein that the same may conform to the record of the case in the Patent Office.

Signed and sealed this 9th day of April, A. D. 1946.

(Seal)

Leslie Frazer

First Assistant Commissioner of Patents.